United States Patent Office 2,885,436
Patented May 5, 1959

2,885,436
PROCESS FOR THE PURIFICATION OF LACTIC ACID

Jørgen Alfred Wangel, Kgs. Lyngby, Denmark, assignor to Aktieselskabet de Danske Sukkerfabrikker, Copenhagen, Denmark No Drawing. Application February 26, 1957
Serial No. 642,329

4 Claims. (Cl. 260—535)

The present invention relates to processes for the purification of lactic acid by steam distillation.

Known processes for the purification of biologically or chemically produced lactic acid are deficient with respect to the separation of the lactic acid from substantially non-volatile impurities. Volatile impurities, such as acetic acid, have been removed by ordinary steam distillation whereby only a negligible portion of the lactic acid is removed with the steam. In this manner, however, no separation from the substantially nonvolatile impurities is obtained.

A number of different methods have been proposed for isolating the lactic acid from said impurities. For instance, it has been proposed to purify salts of the lactic acid, to liberate the acid therefrom, and to extract the liberated acid from its aqueous solution by means of organic solvents, and in this manner a satisfactorily pure lactic acid is obtained. Owing to the conditions of solubility, however, this method requires the use of great amounts of organic solvent. Furthermore, the lactic acid is converted into esters which are hydrolyzed after purification. By concentrating an aqueous solution of lactic acid, the latter is subjected to an esterification whereby monolactyl lactate is produced by the folowing reaction:

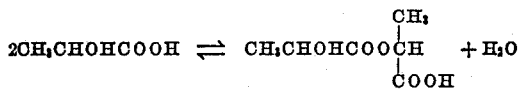

At higher concentration, lactyl lactates of greater molecular weight are also produced. The term "lactic acid" thus covers the free lactic acid as well as lactyl lactates of the mixture. This esterification of the lactic acid has the effect that the concentrated lactic acid will have a low vapor pressure and that a distillation in vacuum will leave a considerable residue of lactyl lactates.

It has also been attempted to steam distill the lactic acid in vacuum, but in this manner only a very low concentration of the distillate is obtained. Finally, a process for the purification of lactic acid has been proposed in which the partially purified acid is highly concentrated at high temperature with the formation of a mixture of lactides and anhydrides, said mixture being then subjected to a washing in water and subsequent steam distillation and simultaneous hydrolysis preferably with an alkaline catalyst. During the formation of lactides and anhydrides, however, a partial destruction with consequent loss of lactic acid takes place, and the alkaline catalyst is quickly made inoperative by formation of lactate by reaction with the liberated lactic acid, an amount of lactic acid equivalent to the amount of the catalyst being at the same time lost for the distillation.

As said processes result partly in losses of lactic acid, partly in great expenses for man-power, chemicals and heat, the cost of the pure lactic acid has hitherto been so high that many otherwise promising technical uses of the pure acid have had to be abandoned. However, according to the present invention it has been possible to overcome the said drawbacks and to establish an effective purification of lactic acid by subjecting the lactic acid in the presence of at least .01% of a non-volatile or substantially non-volatile organic or inorganic acid stronger than lactic acid, to a steam distillation at a pressure of about or above atmospheric pressure, the temperature of the distillation mixture being 140 to 200° C. and the temperature of the steam being 170 to 250° C. In this manner the lactic acid is obtained in a practically quantitative yield and of a degree of purity comparable with the hitherto best technically produced lactic acid.

The avoiding of destruction of the lactic acid by the process according to the invention is assumed to depend upon the fact that the admixture of oxygen from the atmosphere is very small. The practical quantitative yield is assumed to be due to the fact that the constant high steam pressure permits a hydrolysis of the lactyl lactate and that this hydrolysis is catalyzed by said organic or inorganic acid so that free lactic acid will always be present in the reaction mixture. As a catalyst acid, phosphoric acid is preferably used according to the invention. Said acid is very cheap and has a sufficient strength to set up a quick hydrolysis during the distillation. Phosphoric acid will also cause a lenient hydrolysis without destruction of the lactic acid so that a good distillation is obtained. In this respect, both ortho-phosphoric acid and pyro-phosphoric acid are well adapted. In the process according to the invention, other non-volatile or substantially non-volatile inorganic as well as organic acids stronger than lactic acid may be used with good results.

The process according to the invention may be performed discontinuously or continuously. If in the latter case the lactic acid and the steam are introduced into a distilling device or zone separately and in counterflow, the further advantage is obtained that the concentration of the distillate may be held at the same level during practically the whole distillation.

The invention shall be further explained in the following by means of an example.

Example

In a distilling device mounted in an oil bath at 190° C., 88 g. of a technical 92.5% lactic acid, to which .5% phosphoric acid is added, is subjected to a distillation with steam at a temperature of 210° C. and at a pressure somewhat above atmospheric. In this manner, a distillate is obtained which after concentration consists of 88.5 g. of a 90% lactic acid fulfilling the specification of purity according to U.S.P.

I claim:

1. A process for the purification of lactic acid comprising subjecting the lactic acid to a steam distillation, said distillation being carried out in the presence of a hydrolyzing catalyst consisting of phosphoric acid at a pressure of about atmospheric, the temperature of the acid distillation mixture being 140 to 200° C. and the temperature of the steam being 170 to 250° C.

2. A process as claimed in claim 1 wherein the phosphoric acid is mixed with the lactic acid, the resulting mixture being introduced into a distilling zone in a determinable direction, steam being separately introduced in counterflow to the mixture.

3. A process for the purification of lactic acid comprising subjecting the lactic acid to a steam distillation, said distillation being carried out in the presence of a hydrolyzing catalyst consisting of at least .01% phosphoric acid at a pressure of about atmospheric, the temperature of the acid distillation mixture being 140 to 200° C. and the temperature of the steam being 170 to 250° C.

4. A process as claimed in claim 3 wherein the phosphoric acid is mixed with the lactic acid, the resulting mixture being introduced into a distilling zone in a determinable direction, steam being separately introduced in counterflow to the mixture.

References Cited in the file of this patent

UNITED STATES PATENTS

| | | |
|---|---|---|
| 2,278,831 | Cockerville | Apr. 7, 1942 |
| 2,438,208 | Filachione et al. | Mar. 23, 1948 |